April 27, 1948. E. W. LEHMAN ET AL 2,440,341
FASTENER
Filed Jan. 22, 1945

INVENTORS
EUGENE W. LEHMAN
EDWARD M. WHALEN
BY
ATTORNEY

Patented Apr. 27, 1948

2,440,341

UNITED STATES PATENT OFFICE 2,440,341

FASTENER

Eugene W. Lehman, East Cleveland, and Edward M. Whalen, Cleveland, Ohio, assignors to The Cleveland Pneumatic Tool Company, Cleveland, Ohio, a corporation of Ohio Application January 22, 1945, Serial No. 573,833

2 Claims. (Cl. 85—5)

The present invention relates to a fastener for temporarily holding together perforated plates or sheets in perforate alignment, preparatory to the riveting thereof.

An important object of the invention is to produce a fastener or temporary rivet which may be readily applied to and removed from the work, the temporary rivet being constructed in a manner forming a simple assembly which is strong, durable and efficient.

Another object of the invention is to provide a fastener capable of securing perforated metal sheets together in perfect perforate alignment wherein the parts thereof are united in a manner to preclude separate disengagement thereof should the fastener break while in use or while being applied to the sheets.

A further object of the invention is to provide a temporary fastener wherein there is employed a compression spring adapted to be compressed for insertion or removal of the fastener, the spring embodying means for locking the several parts of the fastener in a unitary manner.

Other objects and advantages more or less ancillary to the foregoing reside in the specific construction and aggroupment of the elements peculiar to this structure, as will become apparent from a more complete examination of this specification.

Figure 1:
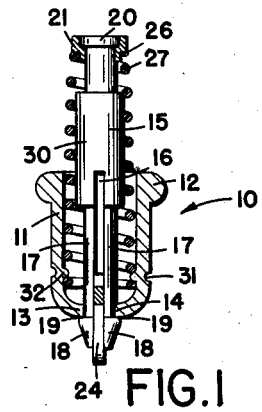
Figure 1 is a vertical sectional view with parts in elevation of the improved fastener.

Referring to the drawing for a more detailed description thereof, the new and improved fastener is generally designated by the reference numeral 10 and comprises a cup-shaped housing 11 formed at its upper end with an external annular flange 12, and having its lower end formed by a cross wall or base 13 with a cylindrical bore 14 extending centrally therethrough.

Slidably mounted within the housing 11 there is a retainer 15 which is preferably formed of a single piece of cylindrical material. This retainer 15 is split throughout a portion of its length, as indicated at 16, to provide a pair of legs 17 which project through the central bore 14. Each leg 17 has its free end provided with a pointed end 18 which forms an outwardly inclined lateral projection 19 for normally engaging the lower face of the base 13, as shown in Figure 1, but is adapted to engage the under side of the work, as will be hereinafter explained. The centralmost portion 30 of the retainer 15 is preferably of a greater diameter than the upper and lower ends thereof, as clearly shown in the drawing, and the upper end is formed with an annular flange 20 which carries a removable C-shaped clamp 21. As presently shown, the clamp 21 when in position on the flange 20, is at least equal to or preferably greater than the diameter of the central-most portion 30 of the retainer.

Resting on the inner face of the base 13 and extending downwardly between the legs 17 there is a spreader 22. This spreader comprises a head portion 23, tail portion 24, and cross arms 25. The arms 25 normally engage the inner surface of the base 13 with the head and tail portions disposed between the legs 17 for maintaining said legs out of contact with one another, and for preventing inward lateral movement of the heads 18 when the fastener is in sheet clamping engagement, as will be hereinafter more fully described.

Interposed between the shoulder 26 of the C-shaped clamp 21 and the cross arms 25 of the spreader 22, there is a compression spring 27 which surrounds the retainer 15. This compression spring tapers upwardly with its lower end 28 being of a diameter greater than its upper end 29 which, in the expanded condition of the spring, grips the enlarged portion 30 of the retainer 15. The spring 27 is designed so that the inside diameter of the upper end 29 is smaller than the diameter of the enlarged portion 30 of the retainer 15 to prevent detachment of the retainer should the fastener become accidentally broken.

The housing 11 is dimpled as indicated at 31, to form knobs 32 adapted to be positioned between the coils of the spring 27 for locking the spring in the housing, whether it is fully compressed or fully extended. The upper coils of the spring 27 in its expanded condition define a hollow truncated cone, the inside diameter of which near its upper end is slightly less than the diameter of the enlarged portion 30 of the retainer. Consequently, in the assemblage of the several parts, the retainer and spreader are first inserted through the bore 14 of the housing 11 and then the spring is placed large end foremost over the retainer and compressed to bring the coils more nearly at right angles with the axis of the spring, thereby increasing the inside diameter of the spring and permitting the end 29 to come just above the enlarged portion 30 so that the clamp 21 may be inserted between the spring and the flange 20. The dimples 31 are formed after the fastener has been assembled.

The fastener in accordance with the present invention has been primarily designed because of its safety features. It has been determined from past experiences that workmen have been seriously injured by parts of the fastener being thrown out of the housing. This is usually caused by breakage of the enlarged heads when the spring is under compression, and the tension of the spring tends to throw the retainer out of the housing with considerable force. This hazard is substantially eliminated by reason of the spring being held within the housing through the medium of the knobs 32, while the tight grip of the spring on the retainer caused by the tapered construction of the former will substantially prevent release of the retainer from the spring. The spring resting upon the cross arms 25 of the spreader will also preclude any possibility of the spreader flying out of the housing.

In the operation of the device, the compression spring 27 active between the collar 21 and the spreader arms 25 will normally urge the retainer 15 upwardly relative to the housing 11, causing the lateral projections 19 of the heads 18 to normally engage the base 13 as shown in Figure 1. In this instance, it will be understood that inward lateral movement of the heads 18 is prevented by the spreader 22 located therebetween.

Figure 2:
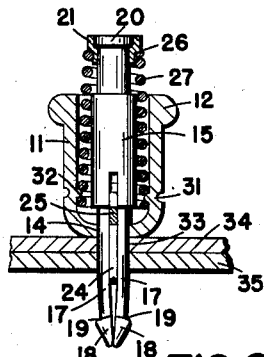
Figure 2 is a view similar to Figure 1 illustrating the position assumed by the fastener during its insertion in the work.
Figure 7:
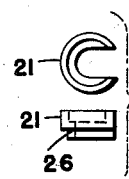
Figure 7 is a top plan and side elevational view of the collar or cap which is mounted at the upper end of the fastener.
Figure 5:
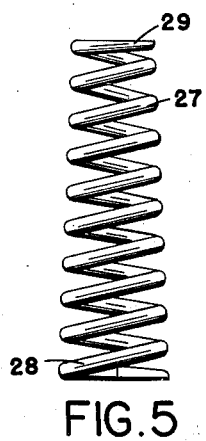
Figure 5 is a side elevational view of the compression spring.
Figure 6:
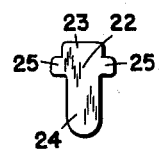
Figure 6 is an elevational view of the spreader which maintains the legs of the fasteners out of contact.
Figure 3:
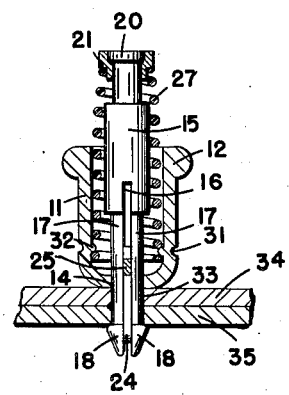
Figure 3 is a similar view illustrating the fastener in operative position.
Figure 4:
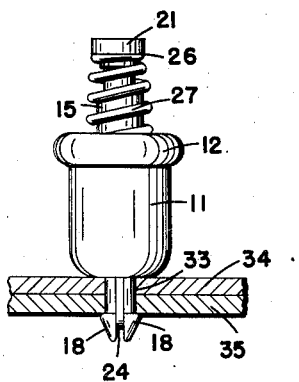
Figure 4 is a side elevational view of the fastener in operative position.

The temporary fastener is applied to or removed from the work by use of a plier-like tool, the construction of which is well known in this art, one jaw of the tool engaging the under side of the annular flange 12 of the housing, and another jaw engaging the flange 20 of the retainer 15. Upon movement of the two jaws toward each other, the retainer 15 will be forced downwardly relative to the housing 11 by compressing the spring 27 and causing longitudinal movement of the heads 18 away from the base 13 and out of operative engagement with the depending portion 24 of the spreader 22. The heads 18 are then free to be inserted through the aligned perforations 33 of the pair of sheets 34 and 35, as shown in Figure 2 of the drawing. It is to be understood that the legs 17 are formed of a material having a certain degree of resiliency which tends to cause the heads 18 to spring toward each other when out of engagement with the spreader 22. The heads 18 when in the position shown in Figure 2, are of a diameter smaller than the sheet perforations 33. With the fastener in the position shown in Figure 2, the pressure exerted on the annular flange 12 and the flange 20 is released, and the retainer 15, due to the action of the compression spring 27, will again be urged upwardly relative to the housing 10, causing the heads 18 of said retainer to be separated or moved laterally away from each other by the spreader tail portion 24. This will cause the lateral projections 19 to engage the under side of the lower sheet 35 for clamping the work between the heads 18 and the base 13. It is understood that the compression spring 27 is sufficiently strong to hold the sheets 34 and 35 tightly clamped and therefore against relative movement. This position of the fastener is shown in Figures 3 and 4 of the drawing.

When it is desired to remove the fastener from the work, pressure through the plier-like tool may again be exerted on the fastener to compress the spring, as shown in Figure 2, in which instance the heads 18 will again spring toward each other to enable their withdrawal through the perforations 33. This removal of the retainer, should the retainer not be maintained perfectly coaxial with the perforations 33, is facilitated by the outwardly inclined projections 19 of the heads 18 simply sliding off the lower edge of the perforation of the lowermost sheet.

Figure 8:
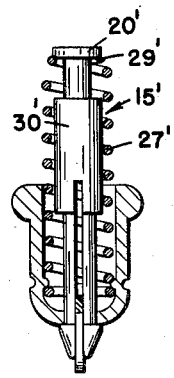
Figure 8 is a vertical sectional view with parts in elevation of a modified form of the invention.

The fastener illustrated in Figure 8 of the drawing differs from the fastener previously described in the elimination of the C-shaped clamp 21. It will be noted that the annular flange 20' formed on the upper end of the retainer 15' has been enlarged so as to equal the diameter of the enlarged portion 30'. By enlarging the annular flange 20' it forms a support for the upper end 29' of the tapered compression spring 27'. As in the previously described form, the spring 27' is designed so that the diameter of the upper end 29' is smaller than the diameter of the enlarged portion 30' of the retainer 15' to prevent detachment of the retainer should the fastener become accidentally broken. In the assemblage of this modified form the same steps are followed as previously described except that, after the uppermost coils of the spring are expanded until they pass over the flange 20', they may be subsequently reformed or compressed radially to insure a more positive engagement with the flange 20'. In all other respects the fastener illustrated in Figure 8 is identical with the fastener illustrated in Figure 1. This fastener is applied to and removed from the sheets in the manner previously described.

From the above description when taken in connection with the accompanying drawing, it is thought to be readily apparent that there has been provided a fastener for temporarily retaining perforated sheets in perforate alignment wherein the compression spring is locked to the housing and the retainer is locked within the compression spring. Therefore, should breakage occur on the heads 18 or spreader 22 when the fastener spring is under compression, there will be precluded any possibility of the retainer or spring flying out of the housing with sufficient force to injure a workman. In fact, there is very little possibility of either the spring or the retainer becoming detached from the housing or being thrown therefrom. This breakage of the heads 18 and the spreader only occurs when the fastener is being applied to or removed from the work or when the fastener is in sheet clamping engagement. In other words, the spring must be under compression in order for there to be any hazard to the workman.

Although the foregoing description is necessarily of a detailed character, in order to completely set forth the invention, it is to be understood that the specific terminology is not intended to be restrictive or confining and it is to be further understood that various rearrangements of parts and modifications of structural

We claim:

1. A fastener for temporarily holding together at least two perforated sheets in superposed relation, including a cup-shaped housing having a base adapted to rest on the upper sheet, a bore extending centrally through said base of a diameter substantially equal to that of the perforations of the sheets, a retainer slidable in said housing including two laterally resilient legs extending through said bore, an outwardly inclined projection on each of said legs below said base, said projections being laterally movable toward each other for insertion through aligned perforations of said sheets and laterally movable away from each other for engagement with the under side of the lower sheet, a rigid spreader member between said legs for normally urging said projections laterally away from each other, and an upwardly tapered spring urging said retainer upwardly relative to said housing for effecting the spreading of said projections by said spreader and the consequent engagement of said projections with the under side of the lower sheet, and means for locking the lower part of said spring in said housing, the upper end of said spring engaging and gripping said retainer to prevent accidental release thereof from the housing.

2. In a fastener of the character described, a cup-shaped housing having a perforated base, a retainer slidable in said housing including two laterally resilient legs extending through said base perforation, an outwardly directed projection on each of said legs below said base, a spreader between said legs for normally urging said projections laterally away from each other, an upwardly tapered spring surrounding said retainer, the lower end of said spring being secured to said housing, the upper end of the spring when expanded gripping said retainer and preventing accidental release of the retainer from the housing.

EUGENE W. LEHMAN.
EDWARD M. WHALEN.